March 16, 1965     H. R. DEUSER     3,173,998
TESTING EQUIPMENT FOR TELEPHONE LINES
Filed Dec. 19, 1960
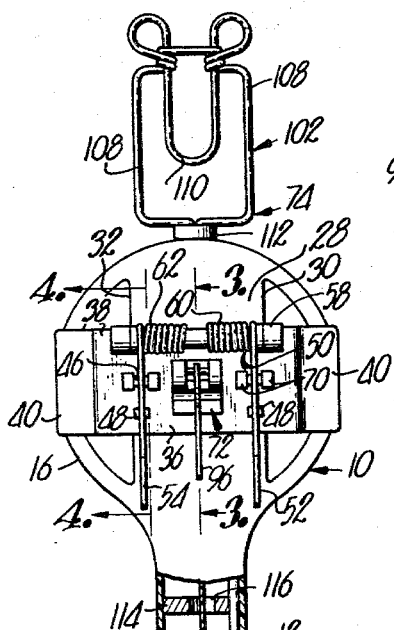
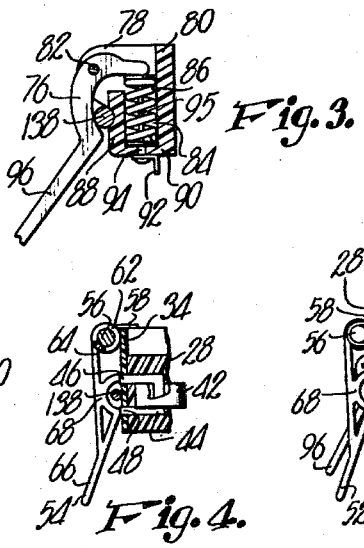
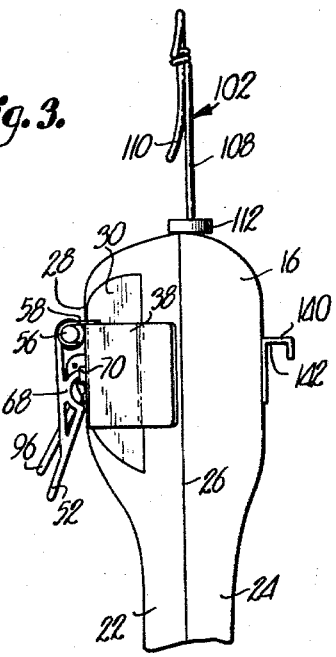
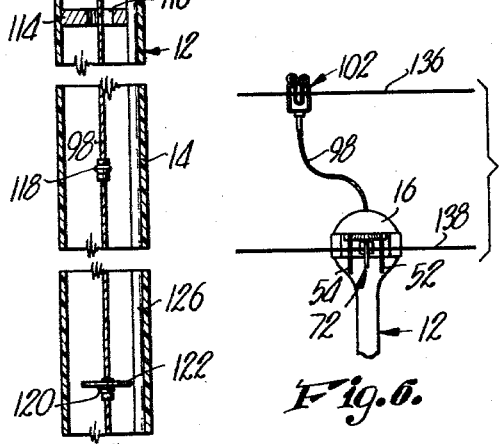
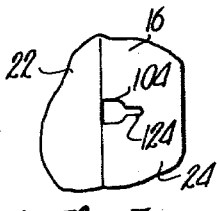
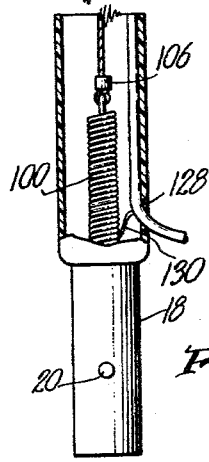
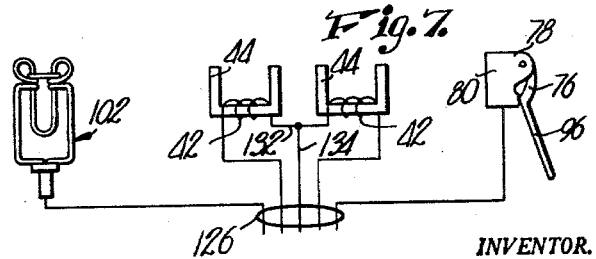
INVENTOR.
Howard R. Deuser
BY
Hovey, Schmidt, Johnson & Hovey
ATTORNEYS.

United States Patent Office 3,173,998
Patented Mar. 16, 1965

3,173,998
TESTING EQUIPMENT FOR TELEPHONE LINES
Howard R. Deuser, 3814 Meadowlane, Wichita 18, Kans.
Filed Dec. 19, 1960, Ser. No. 76,533
13 Claims. (Cl. 179—175)

This invention relates to devices for testing current-carrying lines and, more particularly, to devices for the testing of overhead, current-carrying lines such as telephone lines or the like.

Present-day techniques for testing telephone lines require that testing equipment be elevated to the vicinity of the wires, the latter usually carried by upright, spaced poles, which equipment usually takes the form of an electrical coil which must be positioned around at least one of the current-carrying lines so that the latter may induce a current in the coil for actuating a testing device to thereby determine the fault in the line.

Heretofore, it has been the duty of linemen to scale the poles to place the coil in a position surrounding one of the lines. Further, the testing device to which the coil is operably coupled has also been elevated to the vicinity of the wires so that the lineman operating the coil and device, would, of necessity, be required to be highly dexterous to be able to determine the fault on the line with the said coil and device. Since such a procedure increases the risk of injury to the lineman due to falling to the ground from atop the pole, or due to electrical shocks brought about by the lineman coming into contact with high voltage lines carried by the same pole, such a procedure of testing the telephone lines is unsatisfactory. Further, the time and effort expended to accomplish the testing of the lines in this manner, is considerable, and thereby linemen have been dispatched from more important duties to the duty of testing telephone wires in the manner set forth above.

The present invention circumvents the difficulties encountered when it is necessary to test a line due to some malfunction thereof by providing a means for elevating the testing equipment, specifically, the aforementioned electrical coil, to the vicinity of the wires by a lineman standing on the ground below the telephone lines. By virtue of electrical conduit means, the coil in the vicinity of the wires may be operably coupled to an electrical testing device positioned on the ground adjacent to the lineman so as to preclude the necessity of climbing the pole by the lineman to position the coil over the line, and also to preclude the necessity of elevating the testing device to the vicinity of the lines by the lineman, thus decreasing the time and effort required to accomplish the testing of the lines.

Further, the present invention provides a means whereby the risks, due to the injury of linemen by falls and by electrical shocks, are sharply reduced.

It is, therefore, the primary object of the present invention to provide means for testing telephone lines, which means are adapted to be elevated to the vicinity of the lines while the lineman manipulating the means, remains on the ground, whereby the risk of injury to the lineman due to falls from elevated heights, is eliminated.

Another important object of the present invention is the provision of telephone line testing equipment which may be utilized and operated by a lineman stationed on the ground, whereby the requirement that the lineman climb the pole is eliminated and the time and effort required to test the line, is considerably reduced.

Still another important object of the present invention is the provision of a testing device which may be remotely manipulated by a lineman stationed on the ground, whereby the lineman is not required to scale the pole to which the lines are attached so that the testing equipment need not be manually manipulated in the vicinity of the lines.

Yet another important object of the present invention is the provision of a testing device including an electric coil and a pair of electrical conducting elements carried by an elongated member which may be elevated so that the coil and elements may be raised to the vicinity of telephone lines and operably coupled thereto so as to operate an electrical testing device positioned on the ground adjacent to the lineman manipulating the member.

A further important object of the present invention is the provision of a testing device for testing a pair of electrical conducting lines spaced a standard distance apart, which device is provided with means for interconnecting the lines to testing equipment positioned remotely from the lines, whereby the device may be utilized for a large number of systems having current carrying lines substantially equal to, or less than the said standard spacing.

Another object of the present invention is the provision of a testing device for testing telephone lines spaced above the ground, which device includes an elongated member of nonconducting material which carries a testing coil and line engaging, electrically conducting elements thereon for elevating the latter to the lines by a lineman positioned on the ground, whereby the lineman is substantially insulated from power lines in the same area of the telephone lines to thereby preclude the possibility that the lineman will sustain any electrical shock from coming into contact with the power line.

Other objects of the present invention relate to the provision of an elongated, tubular member for elevating the coil and the conducting elements to the telephone lines, which member is adapted to house therewithin the electrical conductors passing from the coil and elements to the testing device stationed on the ground; to the provision of lever means carried by the member and operably interconnecting the ends of the core of the coil, whereby the lever means and the core, form a continuous magnetic circuit surounding one of the lines when the coil is positioned in the vicinity of the latter; to the provision of resilient means carried by the member in the vicinity of the coil and operably coupled to the lever means, whereby the latter is biased toward a position closing the magnetic circuit; to the provision of a pair of current-carrying elements, one of which is stationary, and the other which is shiftable longitudinally of the member, whereby the member may be manipulated to interengage the elements with the telephone lines to be tested; to the provision of clip means on each of the elements for interengaging the same with the corresponding lines, whereby the elements are releasably secured to the lines during the testing phase thereof; to the provision of a resilient spring interconnected to one of the current-carrying elements to permit the same to be shifted longitudinally of the member so that the device may be utilized with lines of various spacings; and to the provision of a slit in the member providing clearance for the shiftable current-carrying element whereby a projection on the element may hold the element within the slit and thereby prevent further shifting thereof relative to the housing when the shiftable element is connected to the corresponding line.

Other objects of the present invention will become apparent as the following specification progresses, reference being had to the accompanying drawing, wherein:

FIGURE 1 is a fragmentary, cross-sectional, side elevational view of the testing device which forms the subject of the present invention;

FIG. 2 is a fragmentary, end elevational view of the device illustrated in FIG. 1;

FIG. 3 is an enlarged fragmentary, cross-sectional, end elevational view of one of the current-carrying elements forming a part of the present invention, illustrating the means for biasing the same in a position for contacting a current-carrying line to be tested;

FIG. 4 is an enlarged, fragmentary, cross-sectional, end elevational view of the electrical coil which forms a part of the testing device which is the subject of the present invention, illustrating the core therefor and the shiftable means for engaging the core to provide a continuous magnetic circuit for the coil;

FIG. 5 is a fragmentary, plan view of the hollow head forming the upper end of the tubular member upon which the testing equipment is disposed, illustrating the opening therein for permitting one of the current elements to pass through the head and further illustrating the slit adjacent to the opening for maintaining the corresponding element fixed to the member;

FIG. 6 is a view illustrating the manner of operation of the instant device with a pair of current-carrying lines; and FIG. 7 is a schematic view illustrating the electrical coil and current-carrying elements carried by the tubular member and at the normally uppermost end thereof.

The testing device which is the subject of the present invention is broadly denoted by the numeral 10, and comprises a support in the form of an elongated, tubular member 12 of electrical nonconducting material such as a hardened plastic. Member 12 is provided with a cylindrical side wall 14, an enlarged, hollow head 16 integral with side wall 14 at one end thereof, and an adaptor 18 in the form of a tubular sleeve at the other end thereof, it being clear that adaptor 18 may be made of a dissimilar material such as a metal, or the same may be integral with side wall 14.

Device 10 is adapted to be utilized with testing equipment for testing a pair of spaced, current-carrying lines such as telephone lines, and to this end, a plurality of members 12 may be fitted together so that the head 16 of the first-mentioned member 12, is elevated to a position in the vicinity of the lines by a lineman positioned on the ground beneath the wires. To this end, the next adjacent member 12 is fitted over adaptor 18, and pin means may be utilized to interconnect the members 12, it being clear that an aperture 20 is provided in adaptor 18 for receiving the pin means to interconnect the members 12. Since the outer diameter of adaptor 18 is substantially equal to the inner diameter of member 12, the next adjacent member 12 is firmly fitted over adaptor 18 to thereby preclude slack between the members and to provide a substantially rigid means for elevating head 16 to the vicinity of the lines.

Member 12 is preferably molded in a pair of sections 22 and 24 as shown in FIG. 2, sections 22 and 24 being substantial counterparts of each other, and the same are joined along the marginal edges by means of a suitable resin to thereby seal the sections together, leaving a seam 26 at the ends of the unit so formed. Due to the electrically nonconducting characteristics of the material forming member 12, it is evident that linemen utilizing device 10 are substantially insulated from electrical shocks due to the presence of high voltage lines in the vicinity of the telephone lines, thus the risk of injury to linemen by the use of device 10, is sharply reduced.

Head 16 is substantially hollow except for a central portion 28 formed in section 22 for a purpose hereinafter described. Central portion 28 has a pair of spaced, side faces 30 and 32 against which a substantially U-shaped bracket 34 abuts, bracket 34 having a bight portion 36, a pair of side portions 38 in contact with faces 30 and 32 of portion 28, and a pair of outwardly directed flanges 40 integral with side portions 38 and engaging the outer peripheral extremities of section 22 in the region of seam 26. Bracket 34 is of an electrically nonconducting material such as plastic, and may be of the same material which forms member 12, it being clear that bracket 34 is affixed to head 16 by means of a suitable binder, such as a resin cement, so that a rigid interconnection is made between head 16 and bracket 34.

A pair of electrical coils 42 are disposed within central portion 28 and are embedded therewithin during the molding process of the latter. Coils 42 are spaced on either side of the longitudinal axis of member 12, and the same are provided with U-shaped cores having ends 46 and 48 extending outwardly from central portion 28 and protruding through bracket 34. Thus, ends 46 and 48 of each core 44, are exposed and extend slightly outwardly from bracket 34. In the present embodiment of device 10, two coils are shown, one of which is illustrated in detail in FIG. 4, but it is clear that one such coil 42 would be sufficient to make device 10 operable and any number may be utilized as is desired. Coils 42 are interconnected in a manner to be described.

Lever means 50 is carried by bracket 34 for interconnecting ends 46 and 48 of cores 44 to thereby provide a continuous magnetic circuit for the corresponding coils 42, and includes a pair of spaced levers 52 and 54, each swingably mounted on a shaft 56 rigidly secured in any suitable manner to the bight portion 36 of bracket 34, and transversely disposed relative to the longitudinal axis of member 12.

Shaft 56 may be pinned to bracket 34 and also to central portion 28, by means of a pair of J-shaped bands 58 disposed at each end of shaft 56. The bands 58 may be inserted within central portion 28 in any suitable manner. Levers 52 and 54 are rigidly secured to the ends of a pair of coil springs 60 and 62 respectively, the latter wound around shaft 56 and secured thereto to preclude rotation relative to shaft 56.

Levers 52 and 54 are each provided with a first stretch 64, and a second stretch 66 integral with first stretch 64 and inclined relative thereto. A bridging stretch 68 interconnects one end of second stretch 66 to stretch 64 intermediate the ends of the latter. Bridging stretch 68 is provided with a pair of spaced ends which engage the ends 46 and 48 of the corresponding core 44 so as to interconnect the same. As levers 52 and 54 swing away from bracket 34, the ends of bridging stretch 68 become disengaged from the ends 46 and 48 of core 44 and thereby opening the magnetic circuit formed by core 44 and bridging stretch 68. As levers 52 and 54 swing back toward bracket 34 under the influence of springs 60 and 62, bridging stretch 68 once again engages core 44 at the ends 46 and 48 thereof to thereby close the magnetic circuit of corresponding coil 42.

A pair of protuberances 70 are provided on each side of the end 46 of core 44 to prevent any substantial lateral movement of the corresponding lever, either lever 52 or 54, and thus maintain the same between prescribed limits and always in contact with the ends of the corresponding core 44.

Head 16 carries a pair of current-carrying elements which include a first element 72 which is stationary relative to head 16, and a second current-carrying element 74, which is shiftable longitudinally of member 12 and, therefore, shiftable relative to head 16.

First element 72 includes an arcuate first clip or latch 76 which is pivotally mounted intermediate the ends thereof on a pair of spaced ears 78 of an element supporting member 80 by means of a pin 82. Supporting member 80 is secured to bight portion 36 of bracket 34 and extends outwardly therefrom in a direction away from head 16. Support member 80 may be of an electrically nonconducting material such as a plastic, and the same may be secured to bracket 34 by a resin cement.

Supporting member 80 is provided with an elongated recess 84 therein which receives a coil spring 86 which engages one end of first clip 76 to urge clip 76 in a direction to rotate counterclockwise as viewed in FIG. 3. The opposite end of clip 76 engages a bearing segment 88 connected to support 80 by means of a coupling segment 90, thus the rotative motion of clip 76 is limited by the engagement of one end thereof with segment 88. An electrical connection is made between a lug 92 and clip 76 by means of a pin 94 passing through an opening in coupling segment 90, and a length of wire 95 secured to pin 94 and the proximal end of clip 76, said length 95 extending centrally through spring 86.

Second element 74 includes an elongated cable 98 secured at one end thereof with a resilient coil spring 100 and at the other end thereof to a second clip 102. Cable 98 extends within member 12 and through an opening 104 at one extremity of head 16, it being clear that opening 104 is in the normally uppermost extremity of head 16 when device 10 is put into operation.

Spring 100 is secured at the end opposite to the end connected to cable 98 to member 12 at the lowermost end of the latter, and is electrically connected to cable 98 by virtue of a connective 106.

Second clip 102 is formed from a single length of heavy-duty wire and is secured to cable 98 in any suitable manner so as to electrically interconnect the same. Second clip 102 is provided with a pair of spaced wires 108, each disposed on opposed sides of a U-shaped unit 110 integral with wires 106. It is clear in FIG. 2 that unit 110 is disposed out of the plane formed by wires 108 so as to substantially form a hook for engaging a wire to be tested. A rubber snubber 112 is mounted at the ends of wires 108 and engages the top of head 16 adjacent to opening 104 when second clip 102 is proximal thereto.

Member 12 is provided with a baffle 114 secured thereto proximal to the end thereof secured to head 16. Baffle 114 is provided with an opening 116 therein for clearing cable 98 and permit the same to shift longitudinally of member 12. Cable 98 carries a pair of spaced projections 118 and 120, the latter being provided with a disc 122 disposed thereon transversely to cable 98. By virtue of the resilience of spring 100, cable 98 is permitted to be shifted longitudinally of member 12, and projection 118 is small enough to clear the opening 116. As cable 98 continues to move relative to member 12, disc 122 approaches baffle 114 and since the diameter of disc 122 is greater than the diameter of opening 116, baffle 114 precludes further shifting of cable 98 relative to member 12 when disc 122 engages the same. Thus, second clip 102 is adapted to move outwardly from head 16 and, together with first clip 76, forms a pair of electrically conducting elements for engaging a pair of spaced current-carrying lines, such as telephone lines or the like.

A slot 124 is provided in head 16 adjacent to opening 104 and in communication with the latter, to permit the movement thereinto of cable 98 when the same has been shifted outwardly relative to head 16. Projection 118 passes through opening 104 as cable 98 shifts relative to member 12, and as cable 98 shifts laterally into slot 124 and is permitted to retract back into member 12, projection 118 comes to rest on the surface of head 16 adjacent to slot 124 due to the fact that the diameter of projection 118 is greater than the diameter of slot 124.

Electrically conducting wires are provided for coils 42 and first clip 76 and these wires (not shown) are housed in a tubular conduit 126 spanning the distance of member 12, the lower end of conduit 126 emerging from member 12 through an aperture 128 at the end thereof proximal to adaptor 18. The electrical connection to cable 98, and thereby to second clip 102, takes the form of a wire 130 which engages the end of spring 100 which is mounted on member 12. Wire 130 passes into conduit 126 in the vicinity of aperture 128. Conduit 126 then delivers the wires to testing equipment disposed remotely relative to member 12, such as testing equipment placed on the ground adjacent to a lineman manipulating member 12 in the vicinity of overhead telephone lines.

The coils 42 are connected in series as is clear in FIG. 7, and the line 132 common to both, forms a center tap connection to which a center tap wire 134 is attached. The ends of the coils 42 and the ends of the wires connected to first and second clips 76 and 102, are schematically shown as meeting at a common point, namely, within conduit 126.

In operation, second clip 102 is disposed on head 16 in the manner shown in FIGS. 1 and 2. With suitable extensions to member 12 to provide the elevation of head 16 to the vicinity of the telephone lines to be tested, the lineman raises head 16 to the vicinity of the lines, and initially clips or hooks second clip 102 over line 136 as is clear in FIG. 6 of the drawing. The line 136 is, therefore, disposed between wires 108 and unit 110 of second clip 102. Thereupon, member 12 is moved away from line 136 so that cable 98 passes out through opening 104 in head 16. When a sufficient amount of cable 98 has been payed out of head 16, member 12 is shifted laterally relative to cable 98 so as to move the latter into slot 124. Thereupon, member 12 is slightly raised so as to permit projection 118 to rest on the upper surface of head 16 and overlying slot 124. Thus, the lineman is free to manipulate head 16 so that the second line 138 is engaged by levers 52 and 54, and by arm 96.

Second stretches 66 of levers 52 and 54 provide a means for guiding line 138 into the region defined by bracket 34 and bridging stretches 68 of levers 52 and 54. Further, arm 96, secured to clip 76, also guides line 138 so that the latter is moved to a position engaging clip 76 and forced against bearing segment 88, as is clear in FIG. 3. By lowering head 16 with second stretches 66 and arm 96 overlying line 138, the line is forced upwardly into the position within the magnetic circuits formed by cores 44 and bridging stretches 68, and also into electrical contact with clip 76, due to the pivotal actions of levers 52 and 54 and clip 76.

By virtue of the biases of coil springs 60 and 62, and by the bias of spring 86, levers 52 and 54, and clip 76, are urged in directions to maintain wire 138 in the position within the magnetic circuits formed by cores 44 and bridging stretches 68, and into electrical contact with clip 76. Thus, the current flowing through line 138 induces in the coils 42 a current which is utilized to actuate the testing equipment to which coils 42 are operably coupled. Further, since lines 136 and 138 are bare and devoid of insulation, first and second clips 76 and 102 make immediate electrical contact with the lines, and clips 76 and 102 are operably coupled to the testing equipment remote from head 16 and which equipment is operably coupled to coils 42.

When it is desired to remove the device 10 from the operable connection with lines 136 and 138, the lineman elevates head 16 relative to line 138 so as to permit the same to move out of the operating positions set forth above. Hence, levers 52 and 54 and clips 76, yieldably pivot about the respective rotational axes thereof so as to permit the line 138 to move away from head 16. Thereupon, head 16 is shifted laterally after tension has been applied to cable 98 so as to unseat projection 118 on the upper surface of head 16 and into opening 104. The cable 98 will then pay back into member 12 until snubber 112 engages the top of head 16 adjacent to opening 104 therein. The lineman then forces second clip 102 upwardly by the upward movement of member 12 and head 16 thereagainst, and the line 136 moves out of the region between wires 108 and unit 110. Member 12 is then returned to the ground for dismantling the sections attached thereto.

Head 16 carries thereon at the side thereof opposite to bracket 34, a J-shaped wire cleaning element 140 having a downwardly facing abrasive surface 142 adapted to be brought into engagement with lines 136 and 138 prior to the interconnection thereto of clips 76 and 102. By moving member 12, and thereby surface 142, over lines 136 and 138 substantially longitudinally of the latter, the wires are scraped to remove dirt and materials preventing a good electrical contact. The electrical connection between clips 76 and 102 with lines 136 and 138, is thereby greatly enhanced.

Cleaning element 140 is attached to head 16 in any suitable manner such as by pin means or by resin cement.

Device 10 provides a means for elevating testing coils 42 to the vicinity of telephone lines to thereby preclude the scaling of telephone poles by linemen to place the coils manually over the lines. Further, device 10 also carries conducting elements 72 and 74 for making connections to the telephone lines so that the lines may be operably coupled to testing equipment disposed on the ground below the lines. By virtue of levers 52 and 54 and the construction of the cores 44 of coils 42, the linemen can manipulate device 10 so that the lines provide a current for inducing another current in coils 42 so that the testing equipment may be actuated remotely from the vicinity of the lines.

By virtue of the construction of device 10, a great savings in time and effort is realized and further, the risk of injury to linemen due to falls from elevated positions and from electrical shocks, is greatly minimized.

Having thus described the invention, what is claimed as new and desired to be secured by Letters Patent is:

1. In apparatus for testing a pair of spaced, electrical current-carrying lines, a support movable to a position proximal to said lines; a coil of electrically conducting wire carried by said support and provided with a core of relatively high magnetic permeability, said core having a pair of opposed ends and said coil adapted to be operably coupled with a testing device remote from said lines; and shiftable, line-engaging lever means shiftably mounted on said support and normally in bridging relationship to the ends of said core for providing a continuous magnetic circuit wtih said core in surrounding relationship to one of said lines when said support is moved to said position and said lever means is shifted out of bridging relationship to the ends of said core when said lever means is engaged by said one line to thereby permit the latter to pass into a position surrounded by said magnetic circuit, whereby the electrical current flowing through said one line induces a current in said coil for actuating said device, there being means carried by said support and spaced from the ends of said core for releasably securing said one line to said support and for making electrical contact with said one line as the same is surrounded by said circuit.

2. In apparatus for testing a pair of spaced, overhead, electrical current-carrying lines, an elongated support movable to an upright position with one end thereof disposed proximal to said lines; a coil of electrically conducting wire carried by said support at said one end thereof and provided with a core of relatively high magnetic permeability, said core having a pair of opposed ends and said coil adapted to be operably coupled with a testing device remote from said lines; and a lever swingably mounted on said support proximal to said coil and provided with core bridging means engageable with the ends of said core for interconnecting the latter to provide a continuous magnetic circuit therefor surrounding one of said lines when said support is movable to said position, said lever being disposed to be engaged by said one line and shifted thereby to move said bridging means out of engagement with said ends to permit said one line to be disposed within said magnetic circuit, whereby the electrical current flowing through said one line induces a current in said coil for actuating said device, said support comprising a tubular member of electrically nonconducting material, there being electrically conducting wire means within said member, operably coupled with said coil and extending to the opposite end of said member, and structure carried by said member and engageable with said lines in electrical contact with the latter to interconnect the same to said device when said member is moved to said position, said structure including a first element engageable with one of said lines, a second element engageable with the other of said lines, and electrical wire means connected to said elements and adapted to be operably coupled with said device, said first element being pivotally mounted on said member at said one end thereof and said second element being longitudinally shiftable relative to said member.

3. In apparatus for testing as set forth in claim 2, wherein said first element includes a first clip having a surface thereon yieldably engageable with the corresponding line, and a projecting arm on said clip for guiding the line toward said surface of said clip when said member is moved into said position.

4. In apparatus for testing as set forth in claim 2, wherein said second element includes an elongated cable within said member, resilient means secured to said member and to one end of said cable for permitting the latter to be extended longitudinally of said member, and a second clip secured to the opposite end of said cable, said second clip having a region yieldably engageable with the corresponding line.

5. In apparatus for testing as set forth in claim 4, wherein said member is provided with an opening therein at said one end thereof, and wherein is included a slit in said member adjacent to and communicating with said opening, and a projection carried by said cable intermediate the ends thereof, said cable projecting through said opening and said second clip extending outwardly from said member, said cable being movable into said slit and said projection engageable with said member to maintain said cable and thereby said second clip in a fixed location when said cable has been shifted longitudinally of said member.

6. In apparatus for testing a pair of spaced, electrical current-carrying lines, a support movable to a position proximal to said lines; a coil of electrically conducting wire carried by said support and provided with a core of relatively high magnetic permeability, said core having a pair of opposed ends and said coil adapted to be operably coupled with a testing device remote from said lines; a lever of magnetically permeable material; means swingably mounting said lever on the support about an axis spaced from said ends for movement of the lever toward and away from said ends, said mounting means being disposed to permit said lever to engage said ends to thereby form a continuous magnetic circuit with the core; and means biasing the lever toward said ends, said lever having a line-engaging portion projecting outwardly from the support, there being a line-receiving space between said lever and said support, whereby said lever may be shifted away from said ends when said portion engages a line and subsequently shifted toward and into engagement with said ends when said line is in said space.

7. In apparatus as set forth in claim 6, said support being elongated, said core being carried by said support adjacent one extremity thereof, said lever mounting means being disposed between said one end and said core.

8. In apparatus as set forth in claim 6, wherein said support compresses a tubular member of electrically nonconducting material, and including electrically conducting wire means within said member and coupled with said coil.

9. In apparatus as set forth in claim 6, wherein said lever includes an arcuate bridging stretch engageable with said ends and disposed for presenting said space.

10. In electrical line testing apparatus, an elongated support having a line-engaging segment and movable to a position with one extremity of the support being proximal to a line to be tested; an electrical terminal element secured to said support adjacent said one extremity and adapted to be operably coupled with testing means adjacent the opposite extremity of said support; an elongated latch; means between said one extremity and said segment for pivotally mounting said latch for movement toward and away from said segment, said latch having a line-engaging arm extending outwardly from said segment, there being means providing an electrical connection between said element and said line when the latter is disposed between said latch and said segment; and means biasing said latch toward said segment whereby said latch may be shifted away from said segment when said arm engages said line and subsequently shifted toward said segment to retain said line between the segment and latch.

11. In electrical line testing apparatus as set forth in claim 10, wherein said mounting means includes a pin coupled with said latch adjacent one end thereof, said bias means normally engaging with said one end to urge the opposite end of the latch toward said element.

12. In electrical line testing apparatus as set forth in claim 10, said latch being of electrically conducting material, said element being electrically coupled with said latch.

13. In electrical line testing apparatus as set forth in claim 10, and an electrical coil carried by said support adjacent said segment, said coil having a core provided with a pair of spaced ends, said core being disposed relative to said segment with said ends of the core on opposed sides of said line when the latter is retained between said latch and said segment.

References Cited in the file of this patent
UNITED STATES PATENTS

| | | |
|---|---|---|
| 1,523,398 | Ceccarini | Jan. 20, 1925 |
| 1,778,207 | Anderson | Oct. 14, 1930 |
| 1,835,255 | Anderson | Dec. 8, 1931 |
| 2,494,206 | Ross | Jan. 10, 1950 |
| 2,648,052 | Graham et al. | Aug. 4, 1953 |